United States Patent [19]

Müller

[11] Patent Number: 5,642,604
[45] Date of Patent: Jul. 1, 1997

[54] SPACING CONVEYOR MECHANISM

[75] Inventor: Rolf Müller, Mehring, Germany

[73] Assignee: Riverwood International Corporation, Atlanta, Ga.

[21] Appl. No.: 545,894

[22] Filed: Oct. 20, 1995

[30] Foreign Application Priority Data

Oct. 20, 1994 [GB] United Kingdom ............. 9421196

[51] Int. Cl.$^6$ ................................. B65B 35/30
[52] U.S. Cl. ..................... 53/448; 53/48.7; 53/543; 53/531; 53/443; 198/797; 198/798; 198/604; 198/419.3
[58] Field of Search ................ 53/48.7, 251, 252, 53/534, 542, 543, 443, 448, 531; 198/419.2, 419.3, 626.1, 626.5, 604, 797, 798, 799

[56] References Cited

U.S. PATENT DOCUMENTS

| | | | |
|---|---|---|---|
| 2,092,737 | 9/1937 | Perry et al. | 198/798 |
| 2,414,164 | 1/1947 | Nalbach | 198/798 |
| 2,512,356 | 6/1950 | Massiello | 198/798 |
| 2,965,049 | 12/1960 | Royer | 198/797 X |
| 3,648,431 | 3/1972 | Hartbauer et al. | 53/542 X |
| 3,902,590 | 9/1975 | Ramor et al. | 198/798 |
| 4,078,357 | 3/1978 | Ida | 53/48.1 X |
| 4,100,715 | 7/1978 | Ganz | 53/48.7 |
| 4,591,043 | 5/1986 | Muller | 198/626.1 X |
| 5,012,916 | 5/1991 | Cruver | 198/419.2 X |

FOREIGN PATENT DOCUMENTS

| | | |
|---|---|---|
| 0 450 915 | 10/1991 | European Pat. Off. . |
| 2 079 235 | 1/1992 | United Kingdom . |

*Primary Examiner*—Daniel Moon
*Attorney, Agent, or Firm*—Isaf, Vaughan & Kerr

[57] ABSTRACT

A spacing conveyor mechanism (10) for conveying cans (11) along an article feed path (12) in a packaging machine for forming the cans into groups of cans is disclosed. The spacing conveyor mechanism has a pair of spaced drive sprockets (15) positioned along the article feed path, and over which an endless drive chain (14) is passed. A spaced series of carriages (17) are pivotally attached to the drive chain. Each of the carriages includes a conveyor (18), the conveyor having a plurality of recessed pockets (19) sized and shaped to engage one each of the cans therein. Each carriage includes a toothed cog (20) affixed thereto and extending therefrom, each toothed cog being constructed to engage one of a pair of second sprockets (21) when the drive chain changes direction so that each of the carriages is sequentially rotated at a different rate of speed with respect to the rate of speed of the drive chain to maintain the orientation of the conveyors with respect to the article feed path, and the articles being conveyed thereon.

9 Claims, 2 Drawing Sheets

SPACING CONVEYOR MECHANISM

BACKGROUND OF THE INVENTION

This invention relates to spacing conveyor mechanisms for article packaging machines, and in particular but not exclusively for can or bottle multi-pack packaging machines.

SUMMARY OF THE INVENTION

According to a first aspect of the present invention there is provided a spacing conveyor mechanism for an article packaging machine having an article feed path, said mechanism comprising a number of article conveyors mounted on a single endless drive chain for movement in a circuitous path, a part of which is in use adjacent the feed path of the articles and during which part of its path each conveyor engages the articles in the feed path, each conveyor comprising a carriage pivotally attached to the drive chain each carriage incorporating an article engaging member, a further drive sprocket being provided to rotate the carriages relative to the drive mechanism when there is a change in direction in the path of the drive chain so that the conveyors remain substantially parallel to each other throughout their circuitous paths.

Preferably said endless drive chain means comprises a chain extending around a plurality of sprockets. In a further embodiment the drive sprocket comprises a drive wheel associated with each sprocket which drive wheels engage corresponding teeth fixed relative to the carriages and are driven at a predetermined speed relative to the drive chain so as to ensure said parallel movement. It is a preferred feature that said drive wheels are coaxial with their associated sprockets and are driven in rotation with the sprockets by way of gearing.

Conveniently, the article engaging elements are removably attached to their respective carriages and have a number of recessed pockets each for a separate article. Normally the carriages and their associated cogs are attachable at any location along the length of the drive chain and preferably the carriages are, in use, space equally apart from one another along the chain. A preferred feature is that two sprockets are provided such that the chain path has two straight sections and two semi circular sections, one of the straight sections being adjacent the feed path.

According to a second aspect of the present invention there is provided a spacing conveyor arrangement comprising two such spacing conveyor mechanisms located parallel to each other on either side of an article feed path, each set of article conveyors in use engaging separate lines of articles.

An embodiment of the present invention will now be described in more detail. The description makes reference to the accompanying drawings.

DETAILED DESCRIPTION

In the figures there is shown a spacing conveyor mechanism 10 for a packaging machine. The embodiment shown is for spacing and conveying multiples of cans or bottles 11 but it could be for other articles. The mechanism 10 is, in use, positioned adjacent a feed path 12 defined by a moving belt, for example, which conveys the cans or bottles in groups to an area (not shown) where they are automatically packed into boxes, sleeves and the like.

A feed mechanism (not shown) which may be in the form of a star wheel arrangement feeds cans or bottles to the mechanism 10 at a rate equal to the rate required. The mechanism 10 groups the cans or bottles onto a conveyor means, such as the moving belt, which transports the groups to the packing section of the packaging machine. A similar mechanism 10 is oftentimes be provided in parallel to the mechanism shown so as to space and convey articles in one or two rows, the moving belt having space for said row or rows of articles to pass between the two parallel and spaced mechanisms 10.

Figure 1:
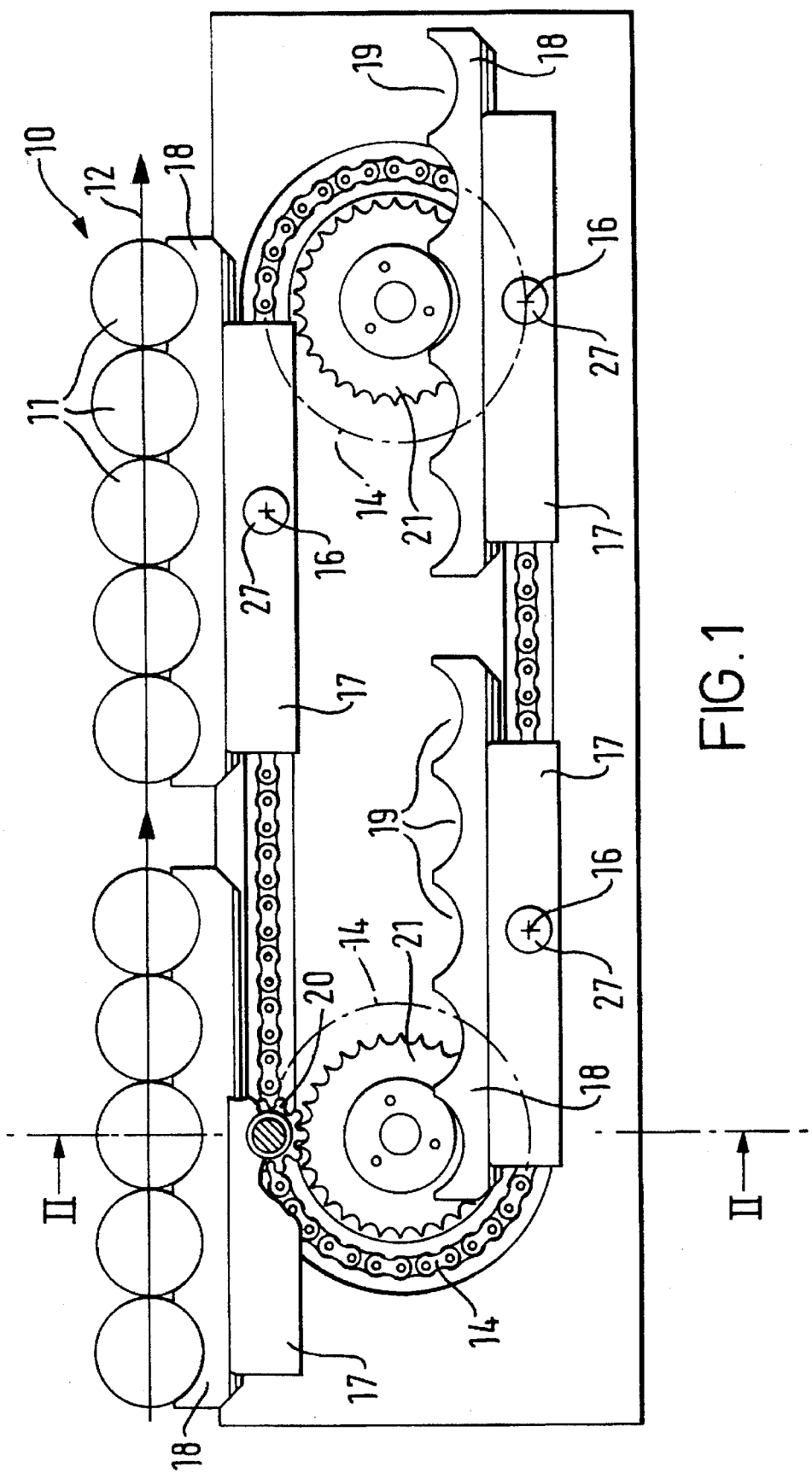
FIG. 1 is a partially cut away plan view of a mechanism according to the present invention.
Figure 2:
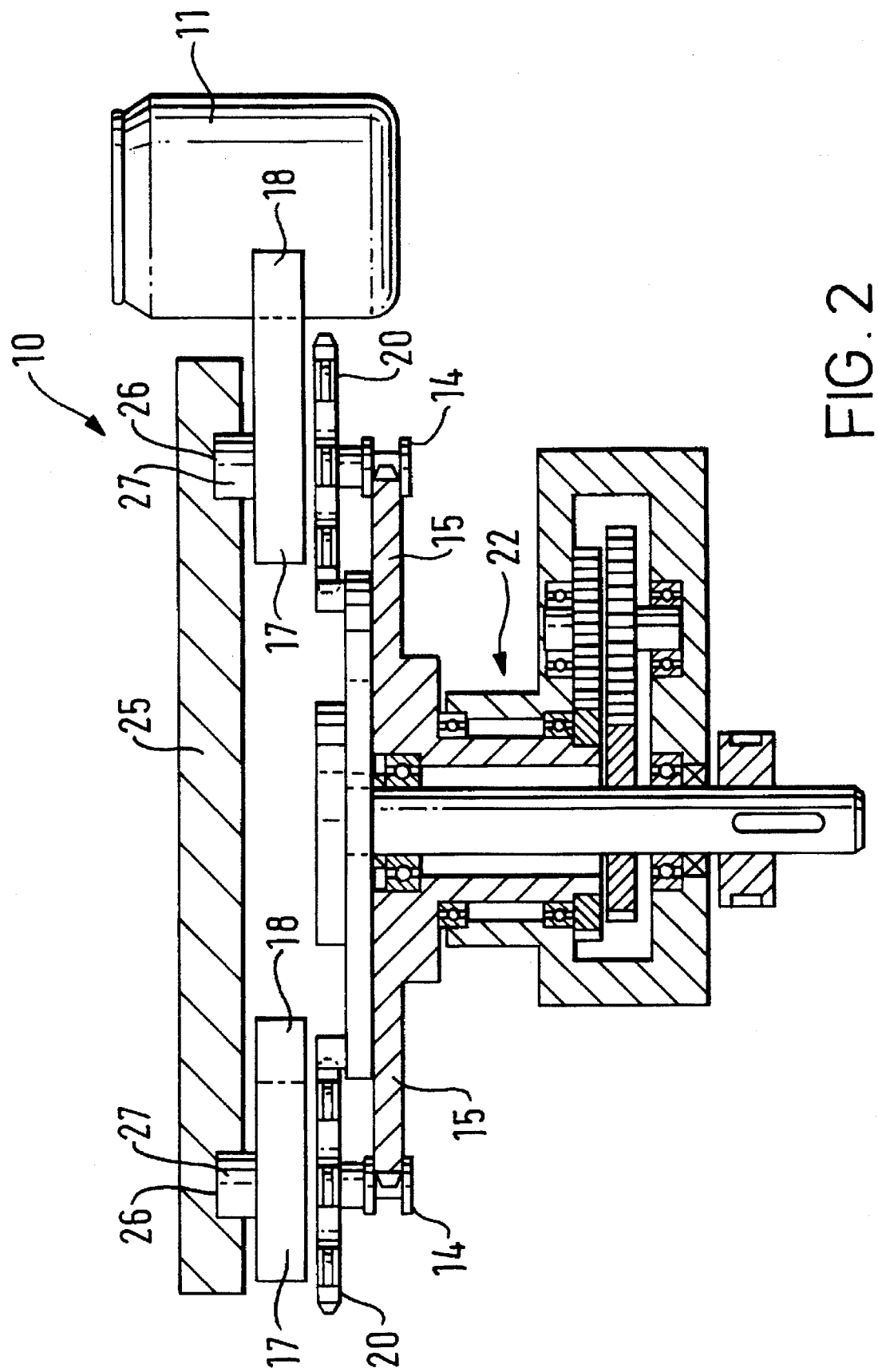
FIG. 2 is a sectional view along line II-II of FIG. 1.

Each mechanism 10 comprises a drive chain 14 which is positioned in a horizontal plane between two sprockets 15 (represented as broken lines without teeth in FIG. 1). Pivotally connected to the chain 14 at equally spaced locations 16 are carriages 17 each carrying a conveyor 18. The conveyors 18 have a number of recessed pockets 19 for receiving a chosen number of individual bottles or cans, which number of course determines the size of the multi-packs being produced.

In the embodiment shown there are five pockets 19 in each of the four conveyors 18 shown so that for every full revolution of the chain, twenty cans 11 will be moved to the packing area in groups of five. Similarly the star wheel (not shown) will feed twenty cans to the mechanism 10 in the same time period. The drives of the star wheel and the chain 14 can be the same, or separate drives can be used as long as the drives are controlled so as to work on the same number of cans in a given time period.

To ensure smooth movement of the cans 11 through the mechanism 10, it is important that the conveyors 18 approach and separate from the cans 11 substantially parallel to the feed path 12. The conveyors 18 and carriages 17 are therefore kept parallel to each other all the times and in particular as they approach the cans and separate there from.

In order to achieve this parallel movement of the conveyors 18 and carriages 17, each carriage is provided with a cog 20 which is fixedly located relative to the carriage 17, coaxially with the pivotal connection to the chain 14. The cog 20 is shown in FIG. 1 on only one of the carriages 17 which is partially cut away. Coaxially mounted relative to each sprocket 15 is a second sprocket 21 which is driven at a different speed to the main sprocket 15 by way of suitable gearing 22. As each carriage 17 passes around a sprocket 15 in its circuitous path, the cog 20 meshes with the second sprocket 21 and this causes the carriage 17 to rotate relative to the chain 14.

It will be appreciated that the movement of the carriages 17 about the sprockets is dependent on various factors namely the relative speeds of the two sprockets 15,21 and the teething ratios of the cogs 20 and second sprocket 21. There are numerous combinations which will maintain the parallel condition.

For example, taking the configuration of the figures let us assume that $d_a$, $n_a$, $w_a$: are the diameter, number of teeth and angular velocity of sprocket 15.

$d_b$, $n_b$: are the diameter and number of teeth of cog 20

$d_c$, $n_c$, $w_c$: are the diameter, number of teeth and angular velocity of second sprocket 21.

The geometry of the system requires that $d_a = d_c + d_b$ and $d = nP$ (Where P is the pitch between teeth)

For a ⅝" drive chain and ½" pitch teeth on the cog 20 and second sprocket 21 we have $$\frac{5 \cdot na}{4} = nb + nc$$

Such that if na =32 teeth, nb=12 teeth then nc=28 teeth
Also, the required drive ratio is:

$$\frac{Wc}{Wa} = \frac{nc + 0.5\, nb}{nc}$$

in order to maintain the parallel nature of the carriages around their circuitous path.

It will be apparent that other drive systems could be used instead of the chains/sprockets and cogs/sprockets. For example toothed belts could be used on even frictional drives.

Other configurations could be provided. For example, more carriages/conveyors 17,18 could be provided on each chain and the number of pockets 19 per conveyor 18 can be changed. Depending on the changes made, adjustments may be necessary in the drive ratio between the feed mechanism and the spacing conveyor mechanism 10. Also, more than two main sprockets 15 may be provided for each mechanism 10, each main sprocket 15 having a coaxial second sprocket as mentioned above.

Also shown in FIG. 1 is an optional cover member 25 in which there is a guide groove 26 of identical shape to the path of the chain 14. An upstanding pin 27 is provided on each carriage 17, coaxially with its pivotal connections at 16. The pins 27 engage in the groove 26 and can assist in maintaining the integrity of the mechanism 10. Suitable, low friction materials are of course best for the pins 27 and groove 26.

While a preferred embodiment of the invention has been disclosed in the foregoing specification and drawings, it will be understood by those skilled in the art that variations and modifications thereof can be made without departure from the spirit and scope of the invention as set forth in the following claims.

I claim:

1. A spacing conveyor mechanism for use with a packaging machine, the packaging machine being supplied with a series of articles moving in an article feed direction along an article, feed path extending through the packaging machine, said spacing conveyor mechanism comprising:
    a first spaced pair of drive sprockets positioned with respect to the article feed path;
    an endless drive chain encircling said drive sprockets and moving along a generally circuitous path with respect to the feed path, said drive chain having a first elongated portion positioned parallel to and adjacent the article feed path and being moved along said circuitous path in the article feed direction;
    a spaced series of article conveyors carded by said drive chain, each said article conveyor including a carriage pivotally fastened to said drive chain and an article engaging member fastened to said carriage, said article conveyors being disposed on said drive chain in a substantially parallel orientation with respect to one another and the article feed path; and
    a second pair of spaced drive sprockets, one each of said second drive sprockets being spaced from and positioned concentrically with respect to one each of the sprockets of said first pair of sprockets, each said article conveyor having a toothed cog affixed thereto and extending therefrom, each said cog being constructed and arranged to engage said second drive sprockets when there is a change in direction of the drive chain along the circuitous path so that each said article conveyor is rotated about said cog at a predetermined speed relative to the speed of said drive chain whereby each said article conveyor remains substantially parallel with respect to the others of said article conveyors and to the article feed path throughout the movement of said article conveyors along the circuitous path of the drive chain;
    said drive chain being constructed and arranged to sequentially move each said article conveyor along said first portion thereof for engaging the articles moving along the article feed path for forming the articles into groups of articles of a predetermined group size.

2. The spacing conveyor mechanism of claim 1, said mechanism including a cover spaced from and at least partially enclosing said article conveyors and a groove defined in said cover and extending along said circuitous path, each said carriage having a pin extending therefrom and opposed to the cog extending from each said carriage, the respective pins of the carriages being received within said groove for guiding the carriages along said circuitous path.

3. The spacing conveyor mechanism of claim 2, wherein said groove defined in the cover is lined with a low-friction plastic, and wherein each of said pins received within said groove is also comprised of said low-friction plastic.

4. The mechanism as claimed in claim 1 wherein each one of said second sprockets is rotatably driven by a gear train driven by each respective one of said first sprockets.

5. The mechanism as claimed in claim 1 and wherein each said article engaging members is removeably attached to one each of the carriages, each said article engaging member having a plurality of recessed pockets, each respective one of said recessed pockets being sized and shaped to receive one of the articles therein.

6. The mechanism as claimed in claim 1 and wherein the cog extending from each said carriage is attachable at any location along the length of the drive chain, and wherein said carriages are spaced equally apart from one another along the length of said chain.

7. The mechanism as claimed in claim 1 and wherein the circuitous path of the drive chain has at least two straight sections and at least two semi circular sections, and wherein said first portion of the circuitous path of said drive chain comprises one of said at least two straight sections.

8. A spacing conveyor assembly for use with a packaging machine, the packaging machine being supplied with two spaced series of articles being generally parallel to one another and moving in an article feed direction along an article feed path extending through the packaging machine, said spacing conveyor assembly comprising:
    a pair of opposed spacing conveyor mechanisms positioned adjacent at least a portion of the article feed path and extending therealong, said spacing conveyor mechanisms being generally parallel to, and spaced apart from one another;
    each said spacing conveyor mechanism including:
        a first spaced pair of drive sprockets positioned with respect to the article feed path;
        an endless drive chain encircling said drive sprockets and moving along a generally circuitous path with respect to the feed path, said drive chain having a first elongated portion positioned parallel to and adjacent the article feed path and being moved along said circuitous path in the article feed direction;

a spaced series of article conveyors carded by said drive chain, each said article conveyor including a carriage pivotally fastened to said drive chain and an article engaging member fastened to said carriage, said article conveyors being disposed on said drive chain in a substantially parallel orientation with respect to one another and the article feed path; and a second pair of spaced drive sprockets, one each of said second drive sprockets being spaced from and positioned concentrically with respect to one each of the sprockets of said first pair of sprockets;

each said article conveyor having a toothed cog affixed thereto and extending therefrom, said cog being constructed and arranged to engage said second drive sprockets so that each said article conveyor is rotated about said cog at a predetermined rate of speed relative to the rate of speed of said drive chain when there is a change in direction of the drive chain along the circuitous path so that each said article conveyor remains substantially parallel with respect to the others of said article conveyors and to the article feed path throughout the movement of said article conveyors along the circuitous path of the drive chain;

said drive chain being constructed and arranged to sequentially move each said article conveyor along said first portion thereof for engaging the articles moving along the article feed path, each said article engaging member being constructed and arranged to engage a plurality of the articles moving along the article feed path for forming the articles into groups of articles of a predetermined group size.

9. A method of forming a series of articles moving in an article feed direction along an article feed path extending through a packaging machine into groups of articles, said method comprising the steps of:

positioning a first spaced pair of drive sprockets with respect to the article feed path;

encircling said drive sprockets with an endless drive chain moving along a generally circuitous path with respect to the feed path, positioning a first elongated portion of said drive chain parallel and adjacent the article feed path, and moving said first portion of the drive chain in the article feed direction;

carrying a spaced series of article conveyors on said drive chain, each said article conveyor including a carriage pivotally fastened to said drive chain, and an article engaging member constructed and arranged to engage a plurality of the articles fastened to said carriage;

positioning said article conveyors on said drive chain in a substantially parallel orientation with respect to one another and the article feed path;

positioning a second pair of spaced drive sprockets concentrically with respect to one each of the sprockets of said first pair of sprockets, said second drive sprockets being spaced from each respective one of the sprockets of said first pair of sprockets;

affixing a toothed cog to each one of said carriages, each said cog being extended away from each respective one of said carriages, and engaging said second drive sprockets with said cog and sequentially rotating each said carriage about said cog at a predetermined speed relative to the speed of said drive chain when there is a change in direction of the drive chain along the circuitous path;

maintaining each said article conveyor in said substantially parallel orientation with respect to the others of said article conveyors and to the article feed path throughout the movement of said article conveyors along the circuitous path of the drive chain in response thereto; and sequentially moving each said article conveyor along said first portion of the drive chain, engaging a plurality of the articles moving along the article feed path with said article engaging members, and forming the articles into groups of articles of a predetermined group size.

* * * * *